United States Patent [19]

Sparks

[11] 4,024,324

[45] May 17, 1977

[54] NOVEL POLYOLEFIN COMPOSITION OF MATTER

[75] Inventor: Allen K. Sparks, Basking Ridge, N.J.

[73] Assignee: UOP Inc., Des Plaines, Ill.

[22] Filed: Dec. 9, 1975

[21] Appl. No.: 639,148

Related U.S. Application Data

[63] Continuation-in-part of Ser. No. 596,692, July 17, 1975, which is a continuation-in-part of Ser. No. 428,561, Dec. 26, 1973, abandoned.

[52] U.S. Cl. .............................. 526/2; 204/159.14; 204/159.23; 260/45.9 AA; 260/45.95 F; 260/DIG. 43; 526/1; 526/6
[51] Int. Cl.$^2$ .......................................... C08J 3/20
[58] Field of Search ............ 260/DIG. 43, 45.9 AA, 260/45.95 F; 204/159.14, 159.23; 526/2, 1, 6

[56] References Cited

UNITED STATES PATENTS

| | | | |
|---|---|---|---|
| 3,371,048 | 2/1968 | Cyba | 260/45.95 |
| 3,382,208 | 5/1968 | Cyba | 260/45.9 AA |
| 3,422,016 | 1/1969 | Cyba | 260/45.9 AA |
| 3,546,161 | 12/1970 | Wolheim | 260/45.9 AA |
| 3,625,744 | 12/1971 | Juna et al. | 204/159.23 |
| 3,661,614 | 5/1972 | Bassemin et al. | 204/159.23 |
| 3,759,807 | 9/1973 | Osborn et al. | 204/159.23 |
| 3,797,690 | 3/1974 | Taylor et al. | 260/DIG. 43 |
| 3,825,627 | 7/1974 | McGaugh | 260/DIG. 43 |
| 3,830,764 | 8/1974 | Hudgin et al. | 260/DIG. 43 |
| 3,935,141 | 1/1976 | Potts et al. | 260/DIG. 43 |

FOREIGN PATENTS OR APPLICATIONS

| | | | |
|---|---|---|---|
| 1,304,112 | 1/1973 | United Kingdom | 204/159.23 |

OTHER PUBLICATIONS

"Polymer Preprints" vol. 13, No. 2, July 15, 1972, p. 627, Scott.

*Primary Examiner*—Eugene C. Rzucidlo
*Attorney, Agent, or Firm*—James R. Hoatson, Jr.; Robert W. Welch; William H. Page, II

[57] ABSTRACT

A novel composition comprising an aryl ketone, a borate or phosphate ester of an alkanolamine, and a polyolefin, said composition being particularly subject to a controlled degradation.

13 Claims, No Drawings

NOVEL POLYOLEFIN COMPOSITION OF MATTER

CROSS-REFERENCE TO RELATED APPLICATIONS

This is a continuation-in-part application of a co-pending application Ser. No. 596,692, filed July 17, 1975, which is in turn a continuation-in-part application of application Ser. No. 428,561, filed Dec. 26, 1973 and now abandoned.

This invention relates to a novel composition comprising an aryl ketone and a borate or phosphate ester of an alkanolamine useful as an additive to polyolefin plastic materials whereby degradation of said materials is effected in a controlled manner. More specifically, this invention relates to a novel composition comprising a polyolefin and said aryl ketone and a borate or phosphate ester of an alkanolamine.

It is known that polyolefin plastic materials generally retain their natural physical properties under normal conditions, thus creating an environmental problem relating to the disposal and decomposition thereof. It has heretofore been the practice to incorporate a light sensitizer in the plastic material to increase its susceptibility to degradation upon being discarded. However the incorporation of said light sensitizer affords a polyolefin plastic material which begins to degrade and weaken substantially immediately upon exposure to light. The art discloses that the degradation period of the polyolefin can be extended by the incorporation therein of certain light absorbers, for example, o-hydroxybenzophenone, 2-(o-hydroxyphenyl)benzotriazole, 2,2',4,4'-tetrahydroxybenzophenone, 2,2'-dihydroxy-4,4'-dimethoxybenzophenone, and the like, but even with this system, the plastic material begins to degrade and weaken substantially immediately upon exposure to light.

In contradistinction to the prior art, and in accordance with the present invention, initiation of the degradation process is delayed by the incorporation in the plastic material of a novel composition comprising an aryl ketone and a borate or phosphate ester of an alkanolamine, thus permitting a maximum retention of strength prior to the onset of the degradation process. Utilization of the present invention will enable a manufacturer of polyolefin plastic materials to produce a product of maximum strength retention during periods of normal use, and subject to relatively rapid degradation thereafter.

The novel composition of this invention, namely, an aryl ketone in combination with a borate or phosphate ester of an alkanolamine, is useful as an additive to hydrocarbon polymers and copolymers including, in particular, the polyethylene and polypropylene polymerization products of ethylene and propylene respectively, but also including the polymerization products of butene, pentene, hexene, styrene, and the like.

It is therefore an object of this invention to provide a novel polyolefinic composition which will retain maximum strength for an extended period prior to the onset of the degradation process.

In one of its broad aspects, the present invention embodies a polyolefinic composition of matter comprising an aryl ketone, a borate or phosphate ester of an alkanolamine, and a polyolefin.

Another embodiment of this invention concerns a polyolefinic composition of matter comprising from about 0.01 to about 10 wt. % aryl ketone, from about 0.01 to about 10 wt. % borate or phosphate ester of an alkanolamine, and a polyolefin.

One of the more specific embodiments relates to a polyolefinic composition of matter comprising from about 0.01 to about 10 wt. % diphenyl ketone, from about 0.01 to about 10 wt. % tris[2-(dicyclohexylamine)propyl] borate, and polyethylene.

Other objects and embodiments of this invention will be found in the following further description of the present invention.

The novel polyolefinic composition of matter comprises an aryl ketone, a borate or phosphate ester of an alkanolamine and a polyolefin. Aryl ketones contemplated within the scope of this invention are those in accordance with structure I.

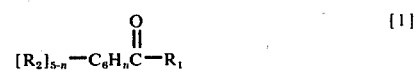

in which $R_1$ is selected from a group consisting of an alkyl, aryl, alkaryl, aralkyl, cycloalkyl, substituted alkyl, substituted aryl, substituted alkaryl, substituted aralkyl or substituted cycloalkyl radical, and $R_2$ is selected from a group consisting of an alkyl, aryl, alkaryl, aralkyl, cycloalkyl, alkoxy, carboxy, carboalkoxy, substituted alkyl, substituted aryl, substituted alkaryl, substituted aralkyl, substituted cycloalkyl, substituted alkoxy, substituted carboxy or substituted carboalkoxy radical, and in which $n$ is equal to an integer between 0 and 5. Such aryl ketones may be exemplified, in particular, by methyl phenyl ketone, ethyl phenyl ketone, propyl phenyl ketone, butyl phenyl ketone, amyl phenyl ketone, hexyl phenyl ketone, heptyl phenyl ketone, octyl phenyl ketone, decyl phenyl ketone, tetradecyl phenyl ketone, diphenyl ketone, 2-methylphenyl phenyl ketone, 3-ethylphenyl phenyl ketone, 4-propylphenyl phenyl ketone, 3-amylphenyl phenyl ketone, 2,3-di-n-butylphenyl phenyl ketone, 2,3,4-triamylphenyl phenyl ketone, 3-phenylbutyl phenyl ketone, 4,6-diphenylhexyl phenyl ketone, cyclobutyl phenyl ketone, cyclopentyl phenyl ketone, cyclohexyl phenyl ketone, 3-methoxyamyl phenyl ketone, 2-ethoxyhexyl phenyl ketone, 3-methoxyphenyl phenyl ketone, 2-ethoxyphenyl phenyl ketone, 3-propoxyphenyl phenyl ketone, 2,3-dimethoxyphenyl phenyl ketone, 2,3,4-triethoxyphenyl phenyl ketone, 2-methoxycyclopentyl phenyl ketone, 3-ethoxycyclohexyl phenyl ketone, 2-carboxyphenyl phenyl ketone, 3-methoxyphenyl methyl ketone, 4-propoxyphenyl cyclopentyl ketone.

The polyolefinic compositions of this invention also contain a borate or phosphate ester of an alkanolamine. The borate or phosphate ester may be of any alkanolamine including such as are prepared from the reaction of an aliphatic amine with one or more equivalents of an olefinic epoxide. Suitable borate esters include, in particular, the borate ester of 2-(dicyclohexylamino)propanol, commonly nomenclated tris[2-(dicyclohexylamino)propyl] borate, the borate ester of N-2-hydroxyethyl-N-butyl-3-methoxy-4-methyl-phenylamine, commonly nomenclated tris[2-(N-butyl-3-methoxy-4-methylphenylamino)ethyl] borate, the phosphate ester of N-2-hydroxyethyl-N-butyl-3-methoxy-4-methylphenylamine, commonly nomenclated tris[2-N-butyl-3-methoxy-4-methylphenylamino)ethyl] phosphate of 2-(dicyclohexylamino)propanol, commonly nomenclated tris[2-(dicyclohexylamino)propyl] phosphate, and the like. Suitable borate and phosphate esters further include the borate and phosphate esters of, for example, N,N'-diethyl-N,N'-di(2-hydroxyethyl)ethylenediamine, N,N'-dipropyl-N,N'-di(2-hydroxyethyl)ethylenediamine, N,N'-dibutyl-N,N'-di-(2-hydroxyethyl)ethylenediamine, N,N'-diamyl-N,N'-di-(2-hydroxyethyl)ethylenediamine, N,N'-di-sec-octyl-N,N'-di-(2-hydroxyethyl)ethylenediamine, N,N'-di-sec-hexyl-N,N'-di-(3-hydroxyheptyl)ethylenediamine, N,N-di-(2-hydroxyethyl)butylamine, N,N-di-(2-hydroxyethyl)amylamine, N,N-di-(2-hydroxyethyl)hexylamine, N-2-hydroxybutyl-N-butyl-3-butylphenylamine, N-2-hydroxyamyl-N-amyl-3-amylphenylamine, N-2-hydroxyethyl-hydroxyamyl-N-butylamylamine, N-2-hydroxyethyl-N,N-dinonanylamine, N-2-hydroxybutyl-N,N-dinonanylamine, N-2-hydroxyhexyl-N,N-dinonanylamine, N-2-hydroxypropyl-N-methylphenylamine, N-2-hydroxybutyl-N-methylphenylamine, N-2-hydroxyamyl-N-methylphenylamine, N-2-hydroxyethyl-N-methyl-2-methylphenylamine, N-2-hydroxypropyl-N-methyl-2-methylphenylamine, N-2-hydroxybutyl-N-methyl-2-methylphenylamine, N-2-hydroxyamyl-N-ethyl-2,3-dimethylphenylamine, N-2-hydroxyhexyl-N-ethyl-2,3-dimethylphenylamine, N-2-hydroxyheptyl-N-ethyl-2,3-dimethylphenylamine, N-2-hydroxyethyl-N,N-dicyclopentylamine, N-2-hydroxyethyl-N,N-dicyclohexylamine, N-2-hydroxyhexyl-N,N-di-2-ethylphenylamine, N-2-hydroxyheptyl-N,N-di-2-ethylphenylamine, 2-(dicyclopentylamino)-propanol, 2-(dicycloheptylamino)propanol, 2-(dicyclo-sec-hexylamino)-propanol, N-sec-butyl-2-hydroxypropylamine, N-sec-butyl-2-hydroxyamylamine, N,N-di-sec-hexyl-2-hydroxyhexylamine, and the like.

The polyolefinic composition of matter herein contemplated further comprises a polyolefin, for example, any of the various and well-known high molecular weight polyethylenes, polypropylenes, polybutylenes, polyisobutylenes, polybutadienes, polyisoprenes, polystyrenes, etc., and also including vinyl resins and plastics, styrene resins and plastics, and the like.

It is understood that the aforementioned aryl ketones, borate or phosphate esters of an alkanolamine, and olefins are only representative of the class of compounds which may be employed and the present invention is not necessarily limited thereto.

Another parameter which is contemplated within the scope of the present invention is the percentage weight composition of the materials comprising the polyolefinic composition. The aryl ketone comprises from about 0.01 to about 10 wt. %, the alkanolamine, borate or phosphate ester comprises from about 0.1 to about 10 wt. % and the olefin comprises from about 80 to about 99 wt. % of the total weight of the polyolefinic composition.

The selected borate or phosphate ester, and the selected aryl ketone can be composited with a desired polyolefin by methods known to the art to effect a uniform composition. For example, the borate or phosphate ester, aryl ketone and polyolefin may be uniformly composited by means of a common solvent, or the selected ester, aryl ketone and polyolefin may be admixed in a slurry type of operation, or said ester and aryl ketone may be ground, milled, or otherwise dry-mixed with the polyolefin to provide a uniform composition.

The following examples are given to illustrate the novel compositions of this invention, and the novel retention of physical properties during exposure to light. These examples are not intended to limit the generally broad scope of the present invention in strict accordance therewith.

EXAMPLE I

About 1 gram of methyl phenyl ketone and 0.5 gram of tris[2-(dicyclohexylamino)propyl] borate are admixed with about 98 grams of polyethylene stabilized against thermal degradation by the inclusion of 0.1 wt. % 1,3,5-trimethyl-2,4,6-tris-(3,5-di-t-butyl-4-hydroxybenzyl)benzene and 0.2 wt. % distearylthiodipropionate. The resulting composition, when exposed to the accelerated ultraviolet aging fadeometer equipment at 35° C., will exhibit a greater retention of physical strength, as herein contemplated, than would be observed if the borate ester had been excluded from the formulation.

EXAMPLE II

In this example, 1.2 grams of 3-cyclopentylphenyl cyclohexyl ketone and 1 gram of tris[n-butyl(3-methoxy-4-methylphenyl)aminoethyl] phosphate are admixed with 98 grams of the thermally stabilized polyethylene to yield a polyolefinic composition which, when exposed to the accelerated ultraviolet aging fadeometer equipment at 35° C., will exhibit a greater retention of physical strength than would be observed if the phosphate ester had been excluded from the formulation.

Other examples of the novel polyolefinic compositions of the present invention comprising an aryl ketone, a borate or phosphate ester of an alkanolamine, and a polyolefin include diphenyl ketone, tris[2-(dicyclohexylamino)propyl] borate, polyethylene; diphenyl ketone, tris[2-(dicyclohexylamino)propyl] phosphate, poly-(butene-1); diphenyl ketone, tris[n-butyl(3-methoxy-4-methylphenyl)aminoethyl] borate, polyethylene; diphenyl ketone, tris[n-butyl(3-methoxy-4-methylphenyl)aminoethyl] phosphate, polystyrene; 4-methoxy-3-methylphenyl 3-methylphenyl ketone, tris[2-(dicyclohexylamino)propyl] borate, polyethylene; 4-methoxy-3-methylphenyl ketone, tris[2-(dicyclohexylamino)propyl] phosphate, polypropylene; 4-methoxy-3-methylphenyl 3-methylphenyl ketone, tris[n-butyl(3-methoxy-4-methylphenyl)aminoethyl] borate, polyethylene; 4-methoxy-3-methylphenyl 3-methylphenyl ketone, tris[n-butyl(3-methoxy-4-methylphenyl)aminoethyl] phosphate, polypropylene; 3-isopropylphenyl 3-phenylpropyl ketone, tris[2-(dicyclohexylamino)propyl] borate, polyethylene; 3-isopropylphenyl 3-phenylpropyl ketone, tris[2-(dicyclohexylamino)propyl] phosphate, polypropylene; 3-isopropylphenyl 3-phenylpropyl ketone, tris[n-butyl(3-methoxy-4-methylphenyl)aminoethyl] borate, polypropylene; 3-isopropylphenyl 3-phenylpropyl ketone, tris[n-butyl(3-methoxy-4-methylphenyl)aminoethyl] phosphate, polyethylene; 3-cyclopentylphenyl cyclohexyl ketone, tris[2-(dicyclohexylamino)propyl] borate, polypropylene; 3-cyclopentylphenyl cyclohexyl ketone, tris[2-(dicyclohexylamino)propyl] phosphate, polyethylene; 3-cyclopentylphenyl cyclohexyl ketone, tris[n-butyl(3-methoxy-4-methylphenyl)aminoethyl] borate, polystyrene; 3-cyclopentylphenyl cyclohexyl ketone, tris[n-butyl(3-methoxy-4-methylphenyl)aminoethyl] phosphate, polyethylene; 2-carboxyphenyl methyl ketone, tris[2-(dicyclohexylamino)propyl] borate, poly-(butene-2); 2-carboxyphenyl methyl ketone, tris[2-(dicyclohexylamino)propyl] phosphate, polyethylene; 2-carboxyphenyl methyl ketone, tris[n-butyl(3-methoxy-4-methylphenyl)aminoethyl] borate, polystyrene; 2-carboxyphenyl methyl ketone, tris[n-butyl (3-methoxy-4-methylphenyl)aminoethyl] phosphate, polyethylene; etc.

It is understood that the aforementioned novel polyolefinic compositions of matter are only representative of the class of compositions of matter which may be prepared and that the present invention is not necessarily limited thereto.

I claim as my invention:

1. A polyolefin containing from about 0.01 to about 10 wt. % of an aryl ketone and from about 0.01 to about 10 wt. % of a borate or phosphate ester of an alkanol amine, said aryl ketone having the structure:

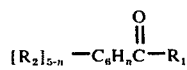

in which $R_1$ is selected from the group consisting of an alkyl, aryl, alkaryl, aralkyl, cycloalkyl, substituted alkyl, substituted aryl, substituted alkaryl, substituted aralkyl or substituted cycloalkyl radical and $R_2$ is selected from the group consisting of an alkyl, aryl, alkaryl, aralkyl, cycloalkyl, alkoxy, halogen, carboxy, carboalkoxy, substituted alkyl, substituted aryl, substituted alkaryl, substituted aralkyl, substituted cycloalkyl, substituted alkoxy, substituted carboxy and substituted carboalkoxy radical, and in which $n$ is equal to an integer between 0 and 5; and said alkanol amine being the reaction product of an aliphatic amine with one or more equivalents of an olefinic epoxide.

2. A composition as defined in claim 1 further characterized in that said polyolefin is a polymer of a hydrocarbon selected from the group consisting of ethylene, propylene, butene, pentene, hexene, butadiene, isoprene and styrene.

3. The polyolefinic composition of claim 1 further characterized in that said aryl ketone is diphenyl ketone.

4. The polyolefinic composition of claim 1 further characterized in that said aryl ketone is methyl phenyl ketone.

5. The polyolefinic composition of claim 1 further characterized in that said aryl ketone is 4-methoxy-3-methylphenyl 3-methylphenyl ketone.

6. The polyolefinic composition of claim 1 further characterized in that said aryl ketone is 3-isopropylphenyl 3-phenylpropyl ketone.

7. The polyolefinic composition of claim 1 further characterized in that said aryl ketone is cyclohexyl 3-cyclopentylphenyl ketone.

8. The polyolefinic composition of claim 1 further characterized in that said ester is tris[2-(dicyclohexylamino)propyl] borate.

9. The polyolefinic composition of claim 1 further characterized in that said ester is tris[n-butyl(3-methoxy-4-methylphenyl)aminoethyl] phosphate.

10. The polyolefinic composition of claim 1 further characterized in that said polyolefin is polyethylene.

11. The polyolefinic composition of claim 1 further characterized in that said polyolefin is polypropylene.

12. The polyolefinic composition of claim 1 further characterized in that said polyolefin is polybutylene.

13. The polyolefinic composition of claim 1 further characterized in that said polyolefin is polystyrene.

* * * * *